Dec. 17, 1968 R. J. NOVITSKE 3,416,174
METHOD OF MAKING FOOTWEAR HAVING AN ELASTOMERIC DIPPED OUTSOLE
Filed Aug. 19, 1964 3 Sheets-Sheet 1
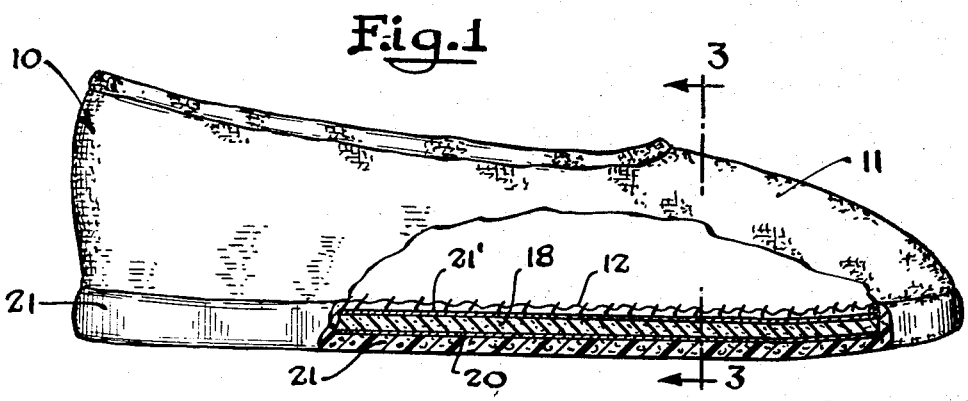
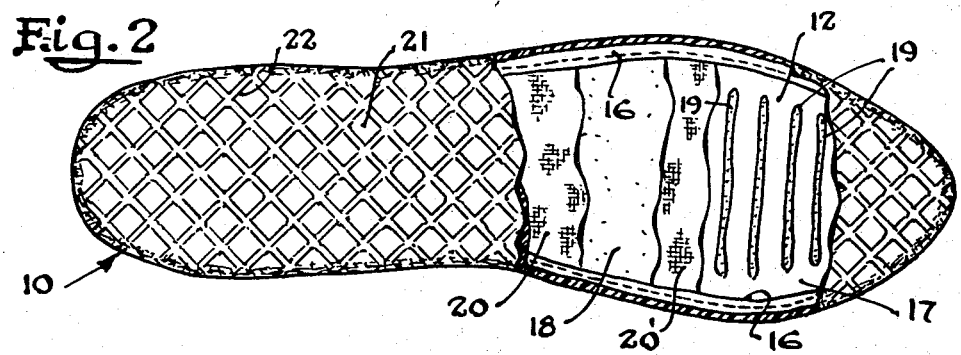
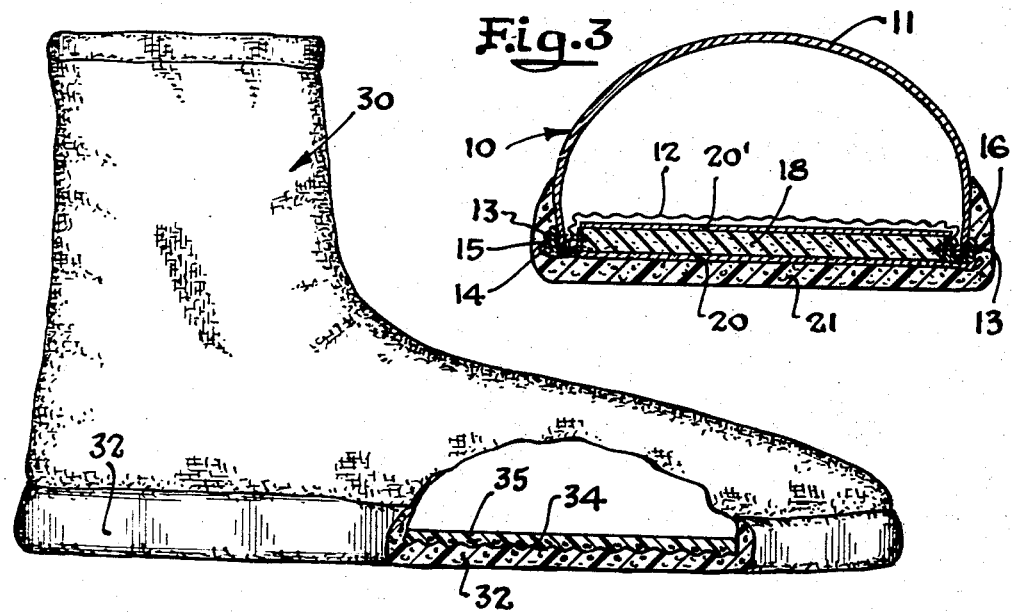
Inventor
Ralph J. Novitske
By Hibben, Noyes & Bicknell
Attorneys

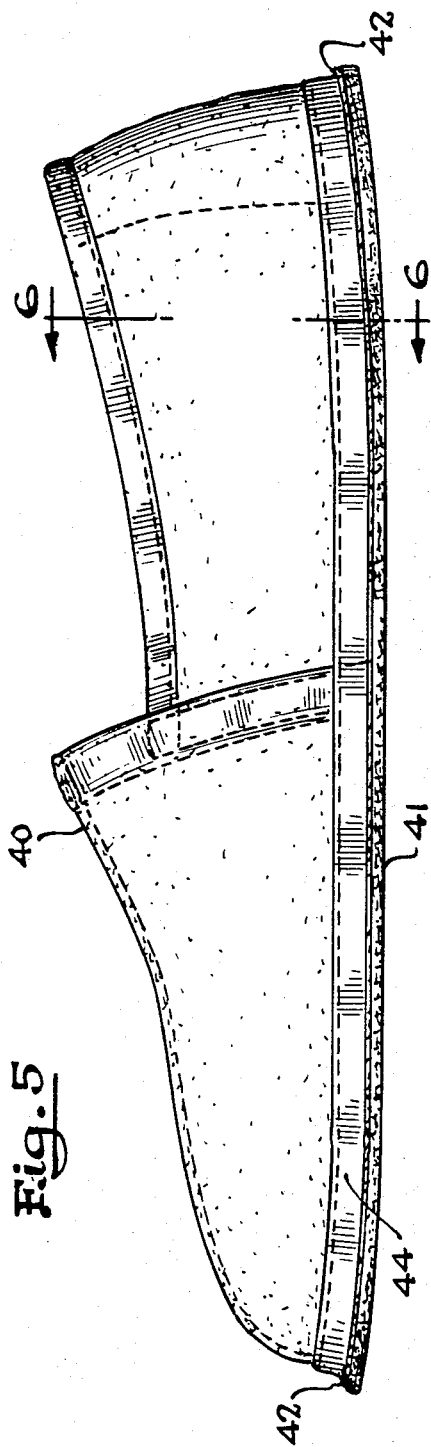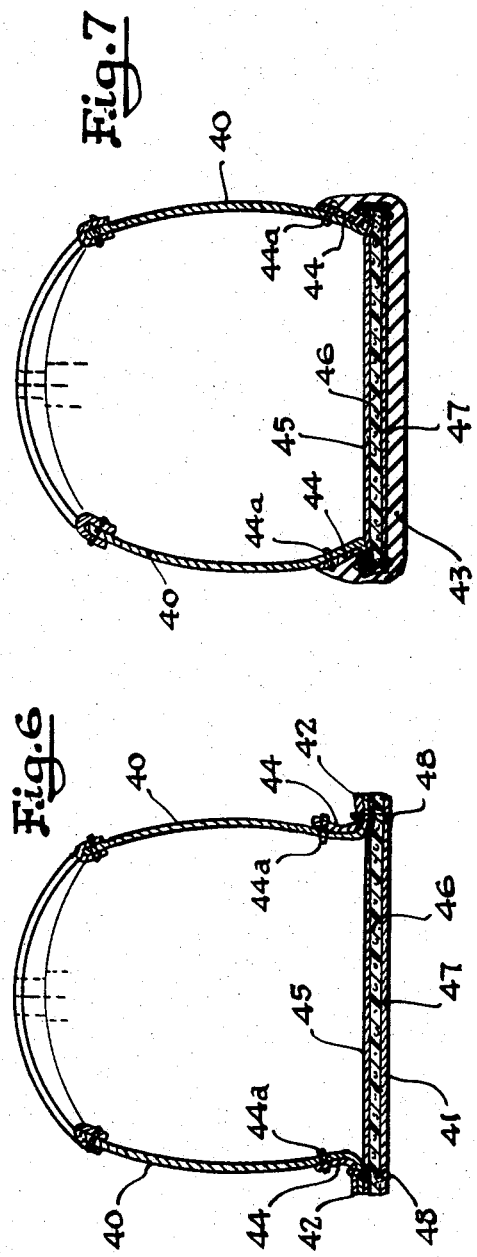
Dec. 17, 1968 R. J. NOVITSKE 3,416,174
METHOD OF MAKING FOOTWEAR HAVING AN ELASTOMERIC DIPPED OUTSOLE
Filed Aug. 19, 1964 3 Sheets-Sheet 2
Inventor
Ralph J. Novitske
By Hibben, Noyes & Bicknell
Attorneys

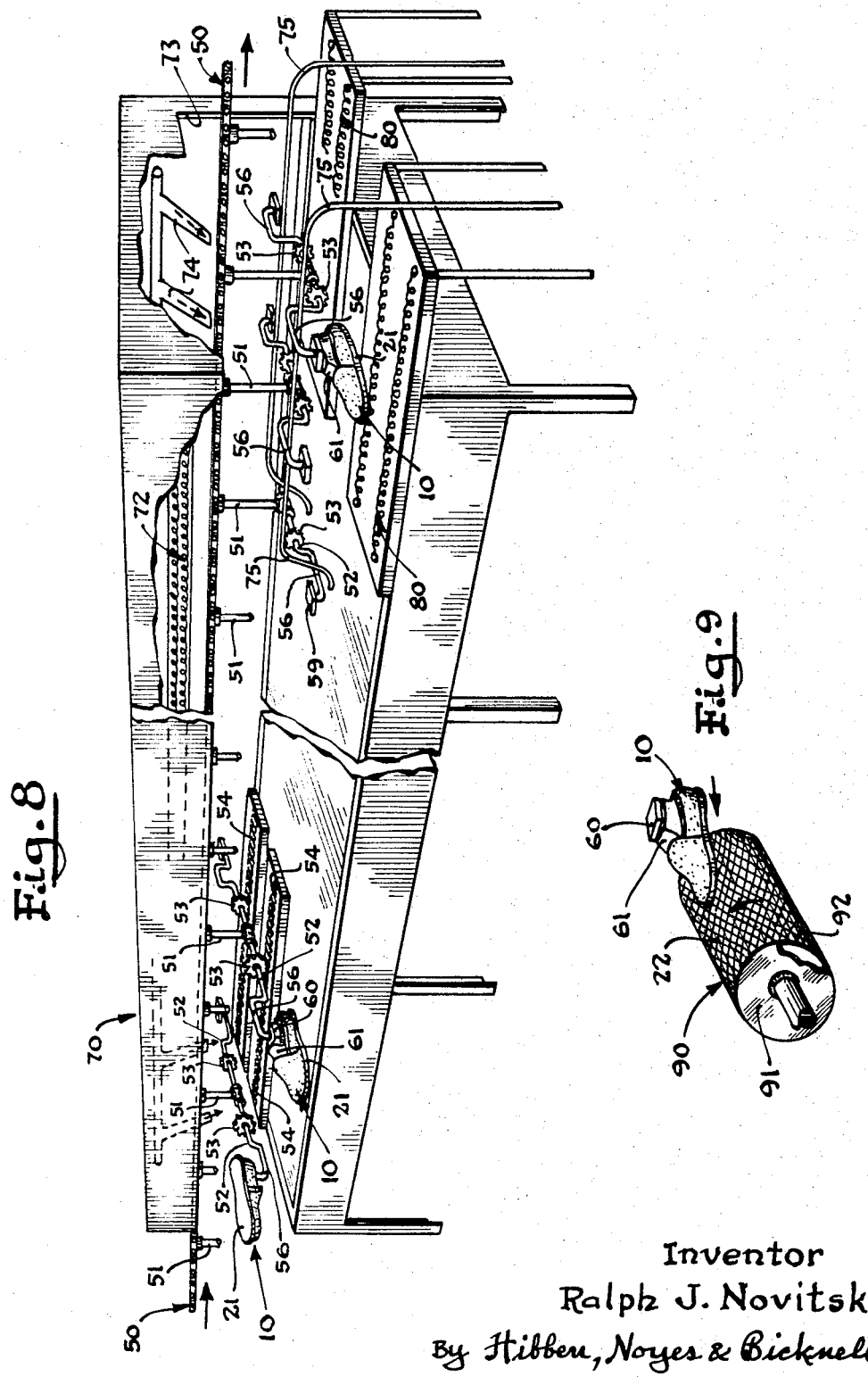

United States Patent Office 3,416,174
Patented Dec. 17, 1968

3,416,174
METHOD OF MAKING FOOTWEAR HAVING AN ELASTOMERIC DIPPED OUTSOLE
Ralph J. Novitske, Ripon, Wis., assignor to Ripon Knitting Works, Ripon, Wis., a corporation of Wisconsin
Continuation-in-part of application Ser. No. 347,073, Feb. 20, 1964, which is a division of application Ser. No. 82,462, Jan. 13, 1961. This application Aug. 19, 1964, Ser. No. 390,641
10 Claims. (Cl. 12—142)

The present application is a continuation-in-part of copending application U.S. Ser. No. 347,073, filed Feb. 20, 1964, now U.S. Patent No. 3,231,914, which is a divisional application of U.S. Ser. No. 82,462, filed Jan. 13, 1961, now abandoned.

The present invention relates generally to footwear and more particularly to a novel slipper-type article of footwear and to a method of manufacture thereof.

In recent years, footwear having a light, flexible, elastomeric sole portion secured to a fabric, leather or composition upper have come into increased usage, particularly for leisure-time wear. The lightness and high degree of flexibility of the latter footwear make this type of footwear very comfortable, and in many instances this footwear has replaced the conventional leather slipper because of the relative ease of manufacture and reduction in cost.

In the manufacture of certain footwear having an elastomeric outsole portion secured to an upper assembly, it has heretofore been customary to stitch or cement the outsole portion to the upper assembly. Thus, certain types of footwear, such as slippers having a flexible elastometric outer sole, for example, are generally made by securing an upper assembly to a preformed elastometric outsole portion by a stitching or cementing operation. In making the usual cloth slipper, one or more side wall sections comprising the vamp and quarter or upper is stitched or cemented to an insole portion which, in turn, is stitched, or cemented to a preformed outsole. Since the glue or cement used to secure the outsole portion to the upper is subject to being washed out when contacted with hot cleaning solutions and the stitches commonly used to secure the outsole portion to the upper assembly tend to break, the useful life of footwear of the foregoing type has been relatively limited and the multiplicity of intricate manufacturing operations are quite costly.

In other footwear, a rubber outsole portion has been vulcanized to an upper assembly by placing a preassembled footwear upper and rubber outsole in a suitable mold and heating the assembly for an extended period to form and cure or vulcanize the rubber outsole composition. The vulcanization process is time-consuming and materially adds to the cost of the article. Moreover, the vulcanized outsole is relatively heavy and often has an odor which some consider disagreeable.

In footwear of the foregoing type, it is also often desirable to provide some added cushioning means associated with the insole or the outer sole. Thus, a flat section of sponge rubber or the like having the form of the insole is often securely cemented to the insole or inner surface of the outsole by applying a coating of cement to one side of the section of sponge rubber and securing it to the insole or outsole before joining the upper to the outsole. When the outsole material is relatively stiff or inflexible and unyielding, a thick section of sponge rubber or the like material is required. The latter requirement, of course, further increases the cost of the footwear.

It is therefore an object of the present invention to provide an improved and more economical method of manufacturing a footwear article having a light, resilient, elastomeric outsole integrally and fixedly secured therewith.

It is also an object of the present invention to provide an improved method and article of footwear in which an upper-insole assembly is provided with an elastometric outsole and wherein the upper-insole assembly used can be constructed more simply and more economically.

It is another object of this invention to provide an improved method and article of footwear in which an elastometric outsole portion is secured to an upper assembly without wasting of sole material, and without stitching, cementing, vulcanizing or application of pressure.

It is a further object of the present invention to provide an improved method of producing a footwear article and an improved footwear article with a dip-formed elastomeric outsole portion securely joined with an upper-insole assembly.

It is still another object of the present invention to provide an improved method of producing a footwear article and an improved footwear article with a dip-formed elastomeric outsole portion securely joined to an upper formed of material with which the elastomeric outsole does not normally form a secure engagement.

It is also an object of the present invention to provide an improved method of producing an improved footwear article with a dip-formed elastomeric outsole having a smooth attractive appearance.

Still another object of the present invention is to provide a novel apparatus for applying and forming an elastomeric outsole on an insole-upper footwear assembly.

Other objects of the present invention will be apparent to those skilled in the art from the following detailed decription and claims to follow when read in conjunction with the accompanying drawing, wherein:

FIG. 1 is a side elevational view in vertical section of an article of footwear embodying the present invention;

FIG. 2 is a bottom plan view of the article of footwear shown in FIG. 1 with a portion of the structure broken away to show the interior construction;

FIG. 3 is a transverse vertical sectional view along the line 3—3 of FIG. 1;

FIG. 4 is a side elevational view partially in vertical section of a modified form of the present invention;

FIG. 5 is a side elevational view of another modified form of upper-insole assembly used in the present invention;

FIG. 6 is a vertical sectional view of the modified form of upper-insole assembly of FIG. 5;

FIG. 7 is a vertical sectional view of a completed footwear article with the upper-insole assembly of FIG. 5 having an elastomeric outsole dip-formed thereon;

FIG. 8 is a fragmentary side elevational view of apparatus used in the manufacture of footwear shown in FIGS. 1 and 4 with wall sections of the apparatus removed to show the interior thereof; and FIG. 9 is a fragmentary perspective view partially in section showing additional apparatus used in the manufacture of the footwear shown in FIG. 1.

The foregoing objects are attained in accordance with one embodiment of the present invention by providing the upper-insole assembly of an article of footwear which can be formed of knitted fabric, woven fabric, plastic, leather or the like, of any desired construction, with an elastomeric outsole portion joined or fused integrally with the upper of the footwear to securely enclose and hold the lower lateral edge portions of a footwear upper and the edge seams where a footwear upper is secured to an insole portion by dip-forming the outsole on the upper-insole assembly. In one preferred embodiment of the present invention the exposed lower edges and seams of the insole-upper assembly are enclosed in an expanded or cellular elastomeric material which forms the outsole portion of the footwear.

More particularly, an improved article of footwear is made in accordance with the present invention by forming a footwear insole-upper assembly of any suitable construction and providing an elastomeric outsole portion thereon by dipping the upper assembly, preferably while mounted on a form or shoe last, into a solution or dispersion of an elastomeric material which is preferably an expandable elastomeric composition, so as to immerse or cover the bottom of the insole and the lower edges of the upper assembly including the exposed lower edge seams thereof. Thereafter, the elastomeric outsole is "welded" or "fused" (i.e., transformed from a flowable to a nonflowable solid state) by exposing the elastomeric outsole to a source of heat without directly contacting the outsole, preferably by passing the dipped upper assembly through a heated oven or enclosure to solidify the elastomeric composition rapidly and form the elastomeric outsole. If required, the area of the upper assembly to be dip-coated can be pretreated with a sizing material to increase the adhesion of the thermosetting elastomeric material thereto. The characteristics of the elastomeric outsole can be largely determined by controlling the composition and viscosiy of the elastomeric material. And, since all the outside lower edge seams of the insole-upper assembly and any cemented outside edge portions of the insole in the present invention are sealably enclosed and held by the elastomeric outsole, the strength of the footwear of the present invention is less dependent on the stitching or cementing operation than in conventionally stitched and cemented footwear structures.

The elastomeric materials which can be used in accordance with the present invention for dip-forming an outsole on an insole-upper assembly of the foregoing type are those which can be provided as viscous solutions or dispersions at temperatures below the char temperature of the upper and insole assembly to be treated therewith and which will within a reasonably short period readily solidify to form a flexible elastomeric outsole portion having satisfactory wear characteristics for the particular use intended. Among the elastomeric materials which can be used to form the improved footwear of the present invention are solutions or dispersions of polyethylene, polypropylene, the vinyl plastics and similar elastomeric materials which form a stable elastomeric compound by the application of heat, as above described. It is preferable to utilize the foregoing specified materials and other elastomeric materials having similar properties in their expandable form. Thus, in the preferred form of the footwear, the upper is dipped in a viscous, elastomeric solution or dispersion, such as expandable rubber latex solution or a polyethylene, polypropylene or polyvinyl chloride solution or dispersion containing a conventional blowing agent which on standing or heating produces a inner cellular structure and a smooth outer skin which can be impressed or otherwise provided with any desired design or pattern.

A particularly suitable type of expandable elastomeric material for use in the manufacture of footwear in accordance with the present invention comprises the expandable plastisols which are dispersions of a polyvinyl chloride resin in a liquid plasticizer along with stabilizers, a dispersant, any conventional blowing agent, colorants where desired, and other modifying agents, if desired. The plastisol composition is formulated so that it is a relatively viscous liquid which can be poured or pumped for ease of handling. For example, the plastisol used can be formed of from ten parts to four hundred parts of plasticizer for every one hundred parts of polyvinyl chloride resin. Since the plastisols contain little or no solvents or diluents, there is little shrinkage problem and the plastisol can be stored for long periods at normal storage temperatures without deteriorating. Where it becomes necessary to lower the viscosity, a small amount of petroleum naphtha or mineral spirits can be added. The expandable plastisol composition is readily expanded and solidified to a tough, resilient, cellular solid by heating to a temperature of generally between about 250 and about 400° F., although heating to a temperature of about 360–390° F. is preferred. The total heating time required for complete conversion of a plastisol liquid preparation to a solid at the latter temperatures preferably varies between 7 to 12 minutes. However, the temperature and time correlations required to complete fusion of the plasticizer and resin is extremely flexible and can vary between much wider limits than the preferred ranges indicated above. When the conversion temperature for the particular plastisol is attained, the conversion into a solid is almost instantaneous and the particles of polyvinyl chloride resin fuse with or dissolve in the plisticizer to form an integral solid compound.

If desired, the elastomeric solutions or dispersions can have suspended therein various solids which will impart a desirable appearance or improved surface characteristic to the elastomeric outsole. For example, particles of colored Mylar plastic, or the like, can be added to the elastomeric solution or dispersion to impart a decorative appearance. Other particles, such as nylon or Teflon, can be added both for improved appearance and wear properties. Also, particles of an abrasive can be suspended in the elastomeric material, if desired.

As previously indicated, the construction of the footwear upper-insole assembly suitable for dipping in the elastomeric solution can be of any desired type, including all the various insole-vamp or upper assemblies which presently have preformed outsole sections secured thereto by stitching, cementing or vulcanizing. However, in the preferred forms of the present invention the insole-upper assembly has a flange formed at the lower edge thereof, as will be described hereinafter. And, because there is less need for reliance on the strength of the stitching or cement to hold the parts of the insole-upper structure in assembled form, a minimum of work is required to form a satisfactory insole-upper assembly for use in the present invention.

In accordance with the present invention, an insole-upper assembly can be formed by joining one or more sections of fabric, leather or plastic with the lower edge thereof lightly stitched, either inseam or outseam, to an insole section of cloth or other suitable material to form a uniform seam or marginal flange completely around the edge thereof. The edge seam is preferably processed to prevent irregularities in the edge portions of the dipped outsole due to the presence of frayed seams, and this is conveniently effected by providing a binding strip over the entire edge seam. The insole-vamp or upper assembly when thus formed and mounted on a suitable form, such as a shoe last, can then be dipped into a liquid elastomeric material of a type heretofore described to provide an elastomeric outsole portion which when solidified securely holds the insole and upper portions together as an integral unit.

Where it is desirable to provide additional cushioning in the above structure, a foam rubber or other resilient section can be cemented, stitched, or otherwise secured to the surface of the insole either before or after the elastomeric outer sole has been solidified, as hereinafter described. For example, in one form of the present invention illustrated, the insole-vamp assembly, after being sewed outseam and mounted on a suitable form but before dipping in the elastomeric material, is provided on the outer surface of the insole with a cushioning means, such as a flat resilient section of foam rubber, expanded plastic, felt or the like material having the hereinafter described properties and which preferably has the same shape as the insole. The expanded or foam rubber resilient section is secured at spaced points to the lower surface of the insole-vamp assembly, with care being taken not to form a completely vapor impervious layer over the entire surface of the insole. Thus, when the resilient section is cemented to the insole, the cement is applied only at spaced points thereover and not as a continuous film. After the resilient section is secured to the insole-vamp assembly and while remaining on the form, an elastomeric material is applied to select portions of the assembly preferably by dipping a portion of the assembly in an expandable liquid elastomeric material which tends to flow and diffuse into the fibers, pores and passages in the surfaces coated therewith. Immediately thereafter the dipped assembly is passed through a heated zone, the temperature which is regulated and the rate of passage therethrough adjusted, so that the particular elastomeric composition is properly expanded and set to form an elastomeric solid while at the same time integrally joining the elastomeric outsole portion to the insole-vamp assembly.

Immediately after dipping and during the initial portion of the passage of the dipped insole-vamp assembly through the heated zone or oven, it is important to continuously rotate the dipped insole-vamp assembly about its longitudinal axis to prevent the elastomeric material flowing unevenly to one portion of the sole and forming an uneven sole portion. The length of time during which the assembly must be rotated and the speed of rotation thereof will, of course, depend on the viscosity and composition of the elastomeric dip material and also on the temperature of the oven. In general, it is necessary to rotate the dipped footwear for only about the first two or three minutes of the 7 to 12 minutes of passage through the heated oven before the elastomeric material becomes form retaining.

While the dipped insole-vamp or upper assembly passes through a heated oven to effect setting or solidification of the elastomeric material, the various solvents, dispersants and the like are of necessity driven from the elastomeric material and must escape without forming blisters therein due to entrapment of vapors or otherwise disrupting the outskin or surface of the elastomeric outsole. When a resilient section is used with or forms a part of the insole portion to provide greater comfort, their air contained therein is an additional source of gaseous fluid which might be entrapped. In order to avoid the latter difficulties, it is essential that the resilient section used with the insole be pervious to the passage of any vapors which are driven from the elastomeric material during the heat treatment and also permit passage therethrough of any gases driven from the resilient section. The latter requirements also make it essential that there be a discontinuous seal between the insole and any resilient section secured thereto so that there will be a plurality of readily available passages over the entire area thereof through which the gases and vapors can easily escape without encountering significant resistance to flow.

In FIGS. 1–3 of the accompanying drawing is shown one specific embodiment of the present invention comprising a slipper 10 formed of an upper 11 stitched as at 13 (see FIG. 3) to an insole 12 around the entire periphery thereof spaced a short distance inwardly from the edge 14. The edges of the upper 11, insole 12, and the stitching 13 are preferably enclosed by a binding strip 15 to eliminate frayed edges and form a marginal flange 16. The flange 16 preferably extends perpendicularly to the plane of the insole 12 forming a pocket 17 in which a resilient section 18 is held in contact with the insole 12 by means of spaced segments 19 of a suitable adhesive. The resilient section 18 preferably has fabric covers 20, 20' extending over the longitudinal surfaces thereof with cover 20 preferably being cemented or otherwise secured to the outer edge of the flange 16 to prevent the flange 16 being accidentally deformed prior to being dipped in the expanded or cellular elastomeric material which forms the cellular elastomeric outsole 21. The outer surface of the outsole 21 is preferably provided with any desired design 22, as by embossing, to improve the appearance and provide increased friction on contact with a smooth surface.

In the modified form of the present invention shown in FIG. 4 of the drawing, a knitted type of footwear illustrated by the slipper sock 30 is shown having integrally fused thereto an expanded or cellular type elastomeric sole 32 with the elastomeric material substantially completely impregnating the knitted sole 34 of the slipper sock to form an inseparable bond therewith. If desired, an inner sole 35 can be inserted into the slipper sock prior to dipping the outer sole surface of the sock in the liquid elastomeric material. On dipping the assembly, the elastomeric liquid passes through the knitted sole 34 and penetrates into the fibers of the insole 35 prior to being solidified. When the elastomeric liquid solidifies, an integral sole structure is formed comprising an insole 35, a knitted intermediate sole 34, and the outer elastomeric sole 32, with each being welded or fusibly joined to the other by the solid elastomeric material.

It has also been found possible to effect still further improvement and economies in the production of an article of footwear of the instant type and provide an article of footwear having an improved appearance by using an insole-upper assembly having a platform portion formed in the plane of the insole about which the elastomeric outsole is dip-formed. Since it is important that the elastomeric outsole protectively enclose the lower portion of the upper assembly, and particularly the connecting means securing the upper to the insole portion, an insole-upper assembly is used which will retain and hold a substantial quantity of elastomeric material in the area where the upper is secured to the insole portion so that the stitching or other connecting means used to join the upper to the insole is offered maximum protection against wear and attack and the outsole portion securely locked or keyed to the insole-upper assembly.

While it is possible to use any conventional material for making the footwear upper section, it has been found that certain materials do not normally form a secure bond with at least some of the fluid elastomeric materials which are used to dip-form the outsole of the footwear or do not exhibit a sufficiently attractive uniform appearance to be a commercially saleable article without pretreatment of the upper. When, for example, the upper is formed of leather, a tightly woven synthetic fabric, such as nylon, Dacron, or the like natural or synthetic plastic materials which do not form a secure bond with polyvinyl plastisol, it is possible to obtain improved adherence of the plastisol material by applying a special sizing or by roughening the surface of the leather engaged by the plastisol material. As the sizing materials are relatively expensive, and as the roughened surface after dipping in the plastisol material does not always present a smooth attractive appearance, it is advisable to provide another means for pretreating the insole-upper assembly to improve the adherence and appearance of the dip-formed outsole. Thus, it has been found possible to obtain the desired adherence between a polyvinyl plastisol and a leather upper assembly by securing a narrow strip of porous cloth around the lower edge of the upper assembly, as will be described hereinafter.

In accordance with the modified form of the footwear invention shown in FIGS. 5, 6 and 7, a footwear upper section 40 and a footwear insole section 41 are joined to form an upper-insole assembly with the lateral wall of the upper section 40 extending generally perpendicular with respect to the plane of the insole section 41 to form a platform or flange 42 at the lower edge of the upper-insole assembly. The upper and insole sections are secured to form the platform or flanged structure in any desired manner, as by stitching, cementing, vulcanizing, or the like. And, in order to provide a secure engagement between the upper section 40 and the plastisol outsole 43 where the upper section 40 is formed of leather, tightly woven nylon, Dacron, or polyethylene fabrics which tend to repel a polyvinyl plastisol or other material, such as rough terry cloth, with which the plastisol does not normally form a smooth secure engagement, it has been found desirable to provide a narrow strip 44 with which the plastisol material forms a secure, smooth engagement along the entire lower edge of the upper section 40. Where the elastomeric material is a polyvinyl plastisol, the strip 44 preferably is comprised of a narrow band about 7/16 inch wide of any porous fabric formed of cotton, synthetic fibers or a thin polyvinyl plastic with or without a loosely woven cloth backing strip. The strip 44 is preferably turned down along one edge about 3/32 of an inch to form a finished upper edge portion which is attached to the upper section 40 by a line of stitching 44a. Thus, in the preferred form of the invention illustrated in FIGS. 5, 6 and 7, the upper section 40 which is formed of sections of leather joined in a unitary assembly has a narrow strip 44 of thin polyvinyl plastic coated cotton sheeting 7/16 inch wide secured to the upper section 40 by stitching 44a so as to cover the entire lower edge portion of the upper section 40.

The insole section 41 to which the lower edge of the upper section 40 and the lower edge of strip 44 are secured is preferably formed by cutting from a preformed assembly comprised of a suitable cloth insole fabric 45 secured to a foam latex sheet 46, preferably by pouring partially cured foam latex material into the insole fabric 45, and with a reinforcing loosely woven cloth 47 secured to the lower surface of the foam latex sheet 46.

The upper section 40 is secured to the insole section 41 and to the strip 44 by a continuous line of stitching 48 adjacent to but spaced slightly from the lower edge of the upper section 40 and inwardly from the outer peripheral edge of the insole section 41 so as to provide the platform or flange 42 along the entire peripheral edge or lower margin of the upper-insole assembly. It will be evident from FIG. 7 that when the upper-insole assembly having the foregoing platform structure is immersed in a elastomeric material, as hereinafter described, the elastomeric material will be retained by the platform or flange 42 of the upper-insole assembly so as to provide a substantial amount of plastic protectively enclosing the stitching 48 which connects the upper section 40 to the insole section 41 and further that the platform or flange 42 provides a means by which the outsole 43 is more securely locked to the upper-insole assembly and forms a secure engagement permanently joining said footwear upper and insole sections.

While the process of providing the upper-insole assemblies with the flexible or expanded elastomeric outsoles described heretofore can be carried out entirely by hand, it has been found preferably to perform the process mechanically by utilizing a continuous conveyor means and associated apparatus for conducting the footwear through a suitable heating means to effect fusion or conversion of the fluid elastomeric material into a flexible elastomeric solid. In FIG. 8 of the drawing is shown an endless conveyor means 50 having a plurality of longitudinally spaced depending members 51 which in the form shown have generally transversely extending form supporting arms 52 rotatably mounted therein adjacent the lower end and extending outwardly therefrom in opposite directions. The supporting arms 52 have at the outer ends thereof a step-like configuration with a bracket 59 mounted on the end thereof for engagement with a mounting plate 60 secured to a footwear support means or form 61. A pinion 53 is fixedly secured to each of the arms 52 adjacent the rotary support therefor in the member 51. The pinion 53 is adapted to engage with a short fixed horizontally disposed geartoothed rack 54 which causes the pinion 53 and the arm 52 to rotate when the conveyor moves the depending member 51 longitudinally with respect to the rack 54.

An open ended elongated heating zone or oven 70 having a generally rectangular form encloses a section of the conveyor means 50 and at least a major portion of the rack 54. The oven 70 is preferably provided with a plurality of infrared heating elements 72 in the upper portion thereof extending substantially the length thereof which are capable of maintaining the temperatures within the oven between about 320° and 400° F. Adjacent each end of the oven 70 is a blower means 74 for providing an air curtain to retain the infrared heat inside the heating zone of the oven 70.

At the outlet end 73 of the oven 70, there is provided a guide rail 75 which preferably extends a short distance into the oven and also a short distance beyond the end 73 of the oven 70. The rail 75 is adapted to engage the lower transversely extending section 56 of the rotatable supporting arm 52 and hold the section 56 in an elevated position so that the elastomeric sole portion 21 faces downwardly. Disposed immediately below the guide rail 75 is an auxiliary infrared heater 80 adjacent the lower surface of the oven 70 which extends outwardly therefrom and which is adapted to reheat the outer surface of the sole 21 of the footwear to facilitate embossing thereon a pattern or design 22 by means of an embossing roll 90 disposed adjacent the outer end of the heater 80.

As shown in FIG. 9, the decorative design 22 can be formed on the outer surface of the sole 21 by pressing the sole while the footwear remains on the rigid form 61 and while the surface thereof is still in a heated condition against the surface of an embossing roll 90 which is comprised of a freely rotatable relatively large diameter roller 91 having on the outer surface thereof a hard rubber cover layer 92 which has the desired design 22 sculptured or molded in the surface thereof. Other means for applying the design 22 can be used, such as using a heated embossing roll or the like. Additional indicia, such as the size of the footwear and a trademark designation can also be impressed in the elastomeric sole portion of the footwear in the foregoing manner.

In order to further illustrate the present invention and without, however, limiting the invention to the specific materials or conditions employed, the following specific example is set forth.

*Example I*

A slipper upper and insole assembly having the form shown in FIGS. 1–3 of the accompanying drawing is mounted on a wooden or metal shoe last or form 61 and a resilient section 18 is secured thereto as described above. Thereafter, the insole portion and edge seams thereof are coated by dipping at room temperature in an expandable, viscous liquid plastisol preparation having the following composition:

| | Parts |
| --- | --- |
| High-molecular weight polyvinyl chloride resin | 100 |
| Di-2-ethylhexyl phthalate plasticizer | 110 |
| Diethylene glycol dibenzoate | 20 |
| Dibasic lead phthalate | 3 |
| p,p-Oxybis-(benzene sulfonyl hydrazide) | 1 |

The plastisol composition is prepared in the conventional manner by blending the several ingredients which are preferably premixed prior to the final blending operation. The plastisol composition has a viscosity of about 12,400 centipoises at room temperautre.

As soon as the dipped slipper assembly is removed from the liquid plastisol composition, the form 61 supporting the dipped assembly is mounted on the bracket 59 which is continually rotated at a rate of between 3 and 6 revolutions per minute for about the first 2 to 3 minutes during the passage thereof through the oven 70 or until the plastisol outer portion has solidified. After the pinion 53 disengages from the rack 54, the slipper assembly is no longer rotated but is moved longitudinally through the oven 70 with the flat surface of the sole 21 facing upwardly toward the infrared heater elements 72 in the upper part of the oven 70 while said oven is maintained at a temperature of about 360° F. The conveyor 50 moves through the oven 70 at a rate of about 1.3 ft. per minute. With an oven having a heating section of about 12 ft. long, a period of about 9 minutes is required for the passage of the slipper assembly therethrough when a temperature of about 360° F. is maintained therein. When th temperature within the oven 70 is at about 390° F., a heating period of only about 6 minutes is required and the conveyor is adjusted accordingly.

As the slipper assembly approaches the discharge or outlet 73 of the oven, the rotatable support arm 52 is engaged by the guide rail 75 as heretofore described to rotate the arm and slipper assembly so that the flat portion of the sole 21 is turned downwardly to face the auxiliary infrared heater 80. During the passage over the latter heater 80, the sole portion is softened and is thereafter immediately brought into contact with the embossing roll 90 to impress a decorative design therein. The slipper is then removed from the form 61 and is ready for packaging, if desired.

While the footwear specifically shown in FIGS. 1-7 of the drawing are intended for use as slippers, it should be understood that the present invention is applicable to the manufacture of other types of footwear, both for indoor and outdoor use. Thus, for example, a tennis and other sports or athletic shoe can be made in the above described manner. Also, with the present invention, it is possible to provide leather uppers with an integral elastomeric sole without damaging the leather, since the leather need not be exposed to a high temperature for a prolonged period.

It will also be understood that the elastomeric outsole of the footwear of the present invention can be provided with a raised heel portion, if desired. Thus, for example, a felt heel section is well suited to being secured to the outer heel portion of the resilient section, which may also be made of felt, before dipping the assembly in the elastomeric liquid, since the felt has sufficient body and resistance to compression to provide the desired heel lift.

I claim:
1. A method of manufacturing an article of footwear which comprises; forming a footwear upper including a footwear upper section and a footwear insole section having marginal portions of said footwear upper section and said footwear insole section joined to provide a preformed footwear upper assembly mounting said footwear upper assembly on a footwear support means, applying a continuous coating of a flowable plastisol material which intimately coats a lateral surface portion of said footwear upper and the exposed surface portions of said insole section securing said support means on a conveyor means adapted to rotate said support means about a horizontal axis to maintain even distribution of said coating and convey said footwear upper assembly through a heating zone, exposing said coating to heat within said heating zone while said footwear upper assembly is roated about said horizontal axis and conveyed through said heating zone to effect solidification of said plastisol material; thereby providing a one piece elastomeric outsole for said footwear upper assembly which securely holds said footwear upper and insole sections in assembly relationship by forming a direct locking engagement with said lateral surface of said footwear upper assembly and said outer surface of said insole section.

2. A method of manufacturing an article of footwear as in claim 1, wherein said plastisol material is an expandable plastisol material.

3. A method of manufacturing an article of footwear as in claim 1, wherein said plastisol material is an expandable polyvinyl chloride plastisol.

4. A method of manufacturing an article of footwear as in claim 3, wherein said heating zone is maintained at a temperature of between about 320° F. and about 400° F. and said footwear assembly is maintained in said heating zone between about 7 and 12 minutes.

5. A method of manufacturing an article of footwear which comprises; forming a footwear upper-insole assembly by joining the lower edge portions of a footwear upper to the peripheral edge portions of a footwear insole, mounting said assembly on a footwear form, applying to said assembly a continuous uniform coating of a flowable elastomeric material which is capable of being transformed into an elastomeric solid on heating and which flows into intimate contact with and encloses the lower edge portions of said upper and the exposed outer surface of said insole, maintaining said assembly mounted on said form in a heating zone to effect solidification of said elastomeric material thereby providing a unitary elastomeric outsole on said footwear assembly which protectively encloses the lower edge portions of said footwear upper and said insole, and said form with said footwear assembly mounted thereon being rotated about a horizontal axis to maintain a uniform distribution of said coating on said lower edge portion and said outer surface during at least the initial period said assembly remains in said heating zone and until said elastomeric material becomes nonflowable.

6. A method of manufacturing an article of footwear as in claim 5, wherein said elastomeric material is an expandable elastomeric material.

7. A method of manufacturing an article of footwear as in claim 5, wherein said elastomeric material is an expandable polyvinyl chloride plastisol.

8. A method of manufacturing an article of footwear as in claim 7, wherein said heating zone is maintained at a temperature of between about 320° F. and about 400° F. and the period said assembly is maintained in said zone is between about 7 and 12 minutes.

9. A method of manufacturing an article of footwear as in claim 5, wherein said flowable elastomeric material is applied to said assembly by means of dipping said footwear assembly in said flowable elastomeric material.

10. In a method of manufacturing an article of footwear having a flexible elastomeric outsole, the improvement which comprises; applying to a preformed footwear assembly having a footwear upper section and a separate footwear insole section with connecting means holding said sections in associated relationship, a continuous coating of a flowable elastomeric material which flows into intimate contact with and covers the lower marginal surface of said footwear upper section and the exposed exterior surface of said footwear insole section including said connecting means, and heating said coating of said flowable elastomeric material by exposing to a source of heat while rotating said footwear assembly about a horizontal axis to maintain an even distribution of said coating until said elastomeric material becomes form-retaining and solidifies to provide a unitary one-piece elastomeric outsole on said footwear assembly which protectively encloses the said connecting means and securely holds said footwear upper and insole sections in assembled relationship by forming and interlocking engagement therewith.

References Cited

UNITED STATES PATENTS

| 1,867,879 | 7/1932 | Crockett. |
| 1,907,856 | 5/1933 | Murphy _____ 12—142 XR |
| 2,580,245 | 12/1951 | Rollman et al. _____ 36—14 |
| 3,116,501 | 1/1964 | Markevitch _____ 36—14 XR |

FOREIGN PATENTS 1,056,745 10/1953 France.

JORDAN FRANKLIN, *Primary Examiner.*

H. H. HUNTER, *Assistant Examiner.*

U.S. Cl. X.R.

36—9, 14; 117—113, 76; 264—321